United States Patent [19]

Hazebrook

[11] Patent Number: 4,869,129

[45] Date of Patent: Sep. 26, 1989

[54] LINEAR RESPONSE LIMITED SLIP DIFFERENTIAL

[75] Inventor: Daniel W. Hazebrook, Detroit, Mich.

[73] Assignee: GKN Automotive, Inc., Auburn Hills, Mich.

[21] Appl. No.: 136,298

[22] Filed: Dec. 22, 1987

[51] Int. Cl.$^4$ .................... F16H 1/44; F16H 57/10
[52] U.S. Cl. .................................. 74/711; 74/411.5
[58] Field of Search ................ 74/711, 710.5, 417, 74/411.5; 192/58 C

[56] References Cited

U.S. PATENT DOCUMENTS

| | | | |
|---|---|---|---|
| 2,949,046 | 8/1960 | Critelli | 74/688 |
| 3,534,633 | 10/1970 | Chocholek | 74/711 |
| 3,760,922 | 9/1973 | Rolt et al. | 192/111 B |
| 3,869,940 | 3/1975 | Webb et al. | 192/711 |
| 3,915,031 | 10/1975 | Hanson | 74/710.5 |
| 3,924,489 | 12/1975 | Yasuda | 74/688 |
| 3,987,689 | 10/1976 | Engle | 74/711 |
| 4,022,084 | 5/1977 | Pagdins et al. | 74/711 |
| 4,031,780 | 6/1977 | Dolan et al. | 192/58 C |
| 4,040,271 | 8/1977 | Rolt et al. | 74/711 |
| 4,048,872 | 9/1977 | Webb | 74/711 |
| 4,058,027 | 11/1977 | Webb | 192/58 C |
| 4,096,712 | 6/1978 | Webb | 74/711 |
| 4,458,559 | 7/1984 | Croswhite et al. | 74/730 |
| 4,493,227 | 1/1985 | Schmid | 74/711 |
| 4,583,424 | 4/1986 | Von Hiddessen et al. | 74/710.5 |
| 4,662,499 | 5/1987 | Jordan | 74/711 |

FOREIGN PATENT DOCUMENTS 3609418 10/1986 Fed. Rep. of Germany ..... 74/710.5

Primary Examiner—Leslie A. Braun
Assistant Examiner—Harold F. Macris
Attorney, Agent, or Firm—Remy J. VanOphem

[57] ABSTRACT

A limited slip differential employs a combined differential gear mechanism with a viscous fluid coupling. A gear connection to a first portion of a drive train causes a limited slip differential housing to rotate. A bevel gear is rotatably attached in fixed position to the interior of the housing. Differential gear sleeves are rotatably attached to either end of the housing. Each of the differential gear sleeves has a differential gear which gearingly meshes with the bevel gear and receives an axle from a second and third portion of the drive train, respectively. One of the differential gear sleeves is translatably movable relative to the housing. A fluid chamber within the housing contains a high viscosity fluid as well as a set of annular plates attached to the housing and a set of annular plates attached to the differential gear sleeve which is translatably movable. The sets of annular plates are in interleaved relation to each other. A cover plate attached to the translatably movable differential gear sleeve, forms part of the chamber wall and is caused to bias toward the bevel gear when the fluid in the chamber heats due to nonsynchronous rotation of the differential gear sleeves. As a result of biasing of the translatably movable differential gear sleeve against the bevel gear, resistance to rotation of the bevel gear develops, causing resistance to differentiation between the differential gear sleeves, resulting in a linear transfer or torque therebetween.

20 Claims, 3 Drawing Sheets

LINEAR RESPONSE LIMITED SLIP DIFFERENTIAL

BACKGROUND OF THE INVENTION

1. Field of the Invention

This invention relates to differential mechanisms, more particularly to a limited slip differential mechanism having an integral viscous fluid coupling.

2. Description of the Prior Art

During driving, all four wheels of a motor vehicle may not be turning at the same rate of speed. This is commonly encountered when the vehicle is making a turn, but can also be caused by variation in tire sizes, braking and nonuniform road surface conditions. In order to accomodate differing wheel spin rates and yet direct engine power to the two wheels (four wheels in a four wheel drive system), it has been a longstanding solution in the art to provide a differential between the powered wheels. The differential allows the wheels to spin at an independent rate and yet deliver power to the wheels. While the solution has proven satisfactory in most driving conditions, it has proven to be unsatisfactory under conditions where one of the powered wheels experiences a road surface having a much lower coefficient of friction than that experienced by the other powered wheel. In such circumstances, the wheel experiencing the least friction with the road will tend, through the action of the differential, to spin while very little torque is supplied to the wheel experiencing higher friction with the road. This can result under road conditions where typically one of the powered wheels has encountered mud or ice, causing the vehicle to become immobilized.

Several attempts have been made in the prior art to rectify this situation in a manner that modifies the differentiation of the wheels when under the extreme conditions described above. In these solutions, a mechanism is used to cause the shafts of each of the powered wheels to tend to rotate at the same rate of speed. This mechanism may take the form of a direct mechanical coupling, a friction coupling, or a fluidic coupling.

Friction coupling mechanisms are exemplified by U.S. Pat. No. 4,583,424 to von Hiddessen et al which teaches a limited slip differential having a differential bevel gear and pressure discs operated by an axial actuator, and by U.S. Pat. No. 3,987,689 to Engle which teaches a limited slip differential planetary pinion gears and an actuator for applying pressure to friction clutch plates in response to speed differences. Both of these solutions suffer from a tendency toward a jump in differentiation resistance when the clutch plates first engage.

Of the fluidic coupling mechanisms, one class of solution uses impellers moving in a viscous fluid. A representative example is U.S. Pat. No. 3,915,031 to Hanson, which discloses a fillable viscous liquid reservoir in which an impeller, connected to one of the powered wheel shafts, rotates; the viscosity of the liquid causing a resistance to differentiation and a more even distribution of torque between the powered wheels. However, this solution suffers from its reliance upon impellers which move in a high viscous medium, causing engine power to be wasted. U.S. Pat. No. 3,534,633 to Chocholek and U.S. Pat. No. 4,493,227 to Schmid disclose similar teachings.

FIG. 1 shows another class of solution utilizing a viscous liquid 10 contained in a housing 12 having located therein closely spaced annular, apertured plates 14 and 16 each alternately attached to one or the other powered wheel shafts 18 and 20. A representative example is U.S. Pat. No. 2,949,046 to Critelli. The housing 12 contains a planetary and orbit gear differential 22, as well as the above described series of plates 14 and 16. Within the housing is the high viscous fluid 10. In the event one of the wheel shafts turns at a rate of speed different from the other, the plates turn relatively to each other in the liquid, generating a viscous coupling between the plates and, consequently, a tendency for the wheel shafts to turn at the same rate of speed. U.S. Pat. No. 3,760,922 to Rolt et al and U.S. Pat. No. 3,869,940 to Webb et al disclose viscous fluid couplings having interleaved annular plates. U.S. Pat. No. 4,040,271 to Rolt et al and U.S. Pat. No. 4,096,712 to Webb disclose viscous couplings wherein the volume of the chambers is controlled by a spring biased piston.

A serious problem, however, occurs during operation of such viscous fluid and plate couplings. The relative rotation between the plates results in Newtonian fluid flow in the viscous fluid, and the relationship between the shafts and the energy input/output is governed by well known equations of viscous drag. However, frequently the relative rotation between the plates is such as to cause non-Newtonian fluid flow in the viscous fluid and the exact nature of the relationship between the shafts and the input/output energy is not governed by the aforementioned equations.

FIG. 2 shows a typical graph of a response curve 24 for the device shown in FIG. 1. The response curve is a graphical plot of output torque verses time, where the coupling variables are held constant. The coupling variables are defined as the number of plates, their aperture configuration, their dimensioning, their spacing, as well as the viscosity of the fluid and its percentage of fill in the housing.

An analysis of the events taking place which are represented by the graph of FIG. 2, are as follows: Between time $T_0$ and $T_1$, energy input to the coupling due to the relative rotation of the plates causes the temperature to rise and the viscosity of fluid to reduce. Hence, the torque across the coupling similarly reduces. Between time $T_1$ and $T_2$, pressure and expansion of the fluid due to increasing temperature continues and now overtakes reduction and viscosity as the cause of change of torque across the coupling. Consequently, the torque across the coupling begins to rise. Between time $T_2$ and $T_3$ pressure builds rapidly because the fluid is completely expanded to fill the housing. The torque now increases rapidly as well. This is attributable to the interaction of slots and grooves in the plates which may present a "paddle wheel" effect. Between time $T_3$ and $T_4$, the limits of the coupling are reached. In some cases the temperature and pressure may continue to rise until the fluid, the coupling, or both are destroyed.

Accordingly, it is not desireable to rely solely upon plate movement within the viscous liquid in order to limit differentiation.

Yet another class of solution has addressed the aforementioned problem by incorporating, besides fluid coupled plates, additional coupling means between the wheel shafts.

One way to accomplish this result is to utilize mutual contact between the plates. Such a solution is disclosed in U.S. Pat. No. 4,022,084 to Pagdin et al. A viscous fluid is used in combination with plates, one set of plates for each wheel shaft, as described above, with the added feature that one of the plate sets is free to move axially. When high relative rotation occurs, the plates tend to come together by an unexpected and undetermined action of the fluid, allowing frictional facings on the plates to make contact.

A second way to accomplish this result is to use the pressure increase developed in the coupling to cause a piston to bring frictional surfaces into contact. U.S. Pat. No. 4,031,780 to Dolan et al and U.S. Pat. No. 4,048,872 to Webb disclose a friction clutch activated by volume expansion of the viscous fluid due to a pressure increase caused by the shearing action of the plates contained therein.

Particularly relevant to the present invention is U.S. Pat. No. 4,058,027 to Webb, a variation on this approach, where two separate couplings of interleaved plates are used in which the plates of one of the couplings are forced into mutual frictional contact by action of expansion of the viscous fluid in the other coupling.

The aforementioned class of the viscous fluid type solution suffers from the drawback that there is a tendency towards a quantum jump in torque output when the clutch elements engage, rather than a continuous increase in torque output.

Finally, U.S. Pat. No. 3,924,489 to Yasuda and U.S. Pat. No. 4,458,559 to Croswhite et al disclose turbine systems which allow for variable torque transfer. The turbine mechanisms in these devices are complicated, causing their use to be limited.

Accordingly, there remains in the art the need to provide a differential having a viscous coupling which functions as a limited slip differential in a motor vehicle, particularly front wheel drive automobiles, in which initial torque output is small and thereafter the torque output smoothly increases until a maximum safe operating torque output is reached.

SUMMARY OF THE INVENTION

The present invention utilizes a differential in combination with a viscous fluid coupling to produce the desired limited slip differential with continuous torque output characteristics. This is achieved through configuring the aforementioned plate and viscous fluid coupling to cooperate directly with the differential. Particularly, the differential is configured having two shafts, one connected to each of the powered wheels, each of which is connected through differential gear sleeves to a differential gear. The differential gears mesh with a bevel gear which is rotatably attached to a fixed location in the housing. The coupling is configured having closely spaced annular plates, in a viscous fluid chamber, in which every other annular plate is attached to one of the shafts, while the remaining annular plates are attached to the housing. As the plates move relative to each other due to each of the powered wheels rotating at different rates, the accompanying fluid heating and associated expansion causes a cover plate which forms one wall of the fluid chamber to be moved. The cover plate in turn causes a differential gear to move into tighter mesh with the bevel gear. As a result, differentiation tends to stop, in a smooth way as expansion of the fluid increases, reaching a maximum when the cover plate reaches its maximum point of travel.

Accordingly, it is an object of the invention to provide a differential coupling which acts to stop differentiation in a smooth, continuous fashion as a function of time.

It is a further object of the invention to provide a differential coupling which is efficient and effective at limiting differential slip, while not interfering with driving of the vehicle during normal handling maneuvers, such as traversing a curve.

It is yet a further object of the invention to provide a differential coupling which permits "straight line steering" on slippery roads and also permits the capability of getting out of "stuck" conditions.

It is still a further object of the invention to provide a differential coupling which is not subject to torque overloading which can result in failure of the fluid, the coupling or both.

These and other objects, advantages, features, and benefits of the invention will become apparent from the following specification.

DETAILED DESCRIPTION OF THE PREFERRED EMBODIMENT

Figure 1:
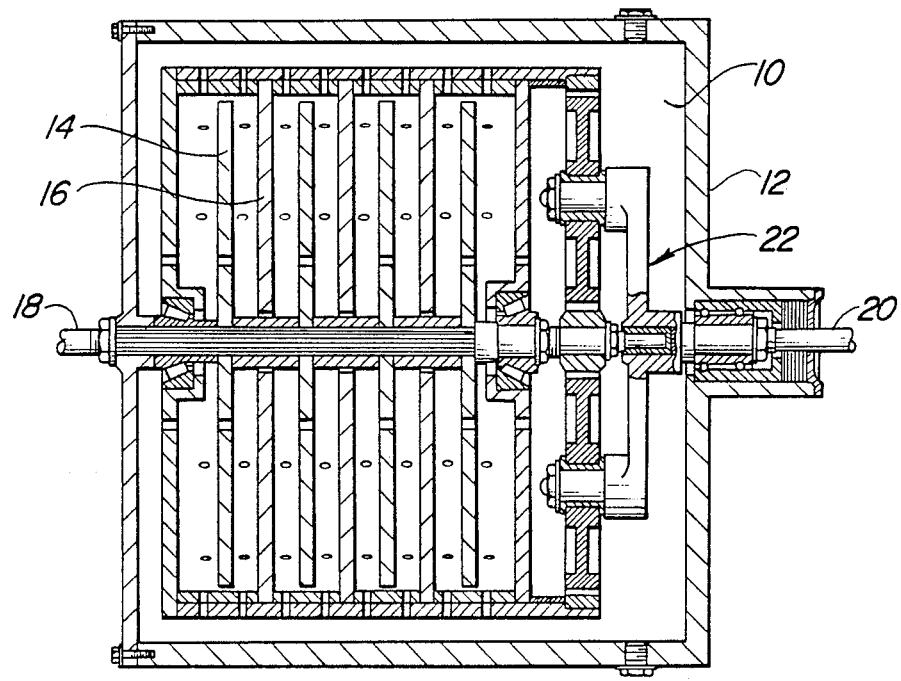
FIG. 1 is a sectional elevational view of a prior art limited slip torque converter.
Figure 2:
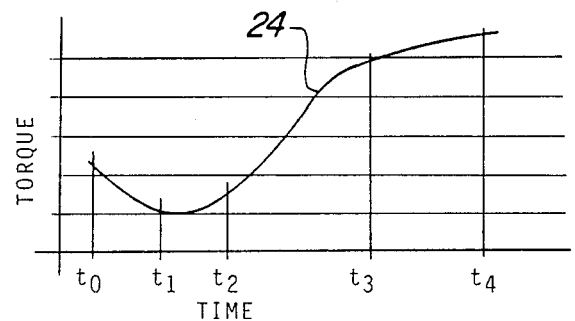
FIG. 2 is a graph showing the response curve of the prior art limited slip torque converter of FIG. 1.
Figure 3:
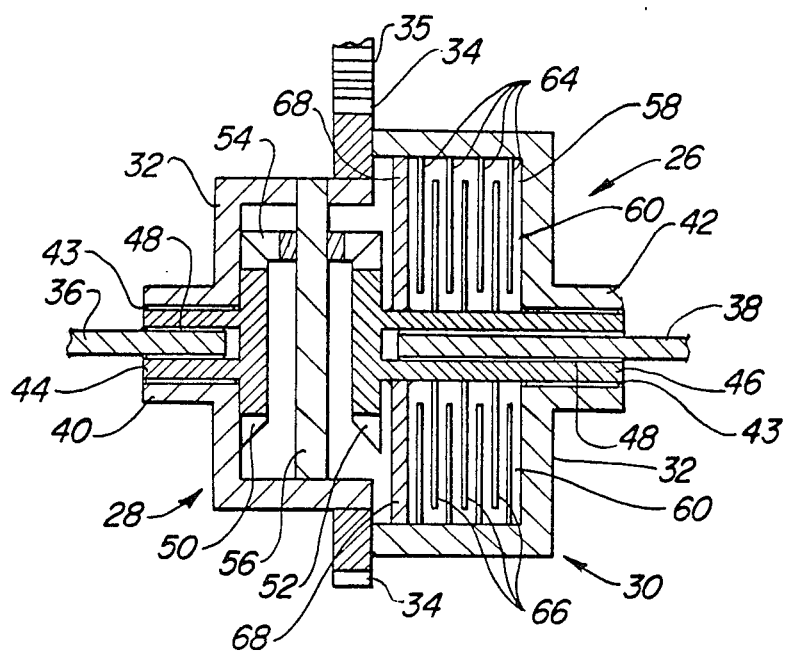
FIG. 3 is a sectional elevational view of a differential and viscous coupling according to the present invention.

Referring now to the figures, FIG. 3 shows the present invention 26 which is a combined differential and viscous fluid coupling. The differential 28 is shown in the figure generally to the left of center; the viscous fluid coupling 30 is shown in the figure generally to the right of center.

The invention has a housing 32. Attached exteriorly to the housing is an externally toothed ring gear 34 which is connected to a pinion gear 35 from the drive train (not shown). When the drive train is operative, the ring gear 34 is caused to rotate, and, because of its attachment to the housing 32, the housing rotates as well. Rotation of the housing 32 occurs around wheel shafts 36 and 38.

The wheel shafts 36 and 38 are caused to rotate in response to rotation of the housing through action of the differential 28, as follows. Each of the shafts 36 and 38 enters the housing at a respective housing hub 40 and 42. Differential gear sleeves 44 and 46 are supported on the respective housing hubs 40 and 42 by A bearing sleeves 43. In addition, the differential gear sleeve 46 is slidable relative to the bearing sleeve 43. The differential gear sleeves 44 and 46 each have an axial cavity in which the wheel shafts 36 and 38 are respectively inserted. Each of the wheel shafts 36 and 38 has splines 48 which cause the differential gear sleeves 44 and 46 to be rotatably locked relative to its respective wheel shaft. The differential gear sleeves 44 and 46 terminate, respectively, in differential gears 50 and 52. The differential gears 50 and 52 mesh with a bevel gear 54 that is free to rotate about an axle 56. The bevel gears are conically shaped, as shown in FIG. 3. The axle 56 is affixed to the housing 32, so that the bevel gear 54 remains in an affixed position relative to the housing.

When the ring gear 34 rotates in response to rotation of the engine, the bevel gear 54 will similarly rotate with the housing 32, causing both wheel shafts 36 and 38 to rotate as well. Should one of the shafts experience a different counter-torque than the other, as might occur for instance when the vehicle is in a turn where the outer wheel must turn faster than the inner wheel, the differential allows each wheel shaft to turn at a different rate, accommodated by rotation of the bevel gear 54.

Coupling between the shafts to limit differentiation is accomplished by the viscous fluid coupling 30, as follows.

A fluid tight chamber 58 is provided in the housing 32. The chamber 58 is filled with a high viscosity fluid 60. High viscosity is defined as a fluid having a viscosity rating of between 30,000 and 350,000 centistokes. Within the fluid tight chamber 58 are located two sets of closely spaced annular plates 64 and 66, one set interleaved relative to the other. One set of annular plates 64 is connected to the housing 32 and the other set of annular plates 66 is connected to the differential gear sleeve 46. The fluid tight chamber 58 is sealed at the end opposite the housing hub 40 by an annular cover plate 68 that is attached to the differential gear sleeve 46. The differential gear sleeve 46 is slidably connected to the wheel shaft 38 by means of the splines 48 as well as the sleeve 43. Therefore, the annular cover plate 68 and the differential gear sleeve 46 are axially slidable along the wheel shaft 38 relative to the housing 32. When fluid pressure rises in the high viscosity fluid 60 in response to shear caused by a relative motion between the wheel shafts 36 and 38, pressure is applied to the annular cover plate 68. The annular cover plate 68 is then urged, as a consequence of fluid pressure, to the left in FIG. 3, taking the attached differential gear sleeve 46 and the differential gear 52 along with it. As a result, the differential gear 52 is caused to mesh tighter with the bevel gear 54. This increase in meshing force has the consequence that the bevel gear 54 will tend to stop rotation and, hence, both shafts 36 and 38 will tend to come into the same rate of rotation as torque is transferred from the slipping wheel to the non-slipping wheel.

In the operation, the drive train of the vehicle causes the ring gear 34 to rotate, imparting rotation to the housing 32 and to the attached bevel gear 54. The rotary movement of the bevel gear causes the wheel shafts 36 and 38 to turn synchronously with it through action of the differential gears 50 and 52 and the splines 48, provided each wheel shaft has an equal counter-torque acting on it.

When both wheel shafts turn at the same rate, the annular plate 64 and 66 turn synchronously as well. However, when one of the shafts encounters a differing counter-torque from that encountered by the other, such as caused by turning, the shafts are allowed to rotate at differing angular velocities by action of the differential; that is, the bevel gear 54 will rotate in order to accommodate the variance in wheel shaft rotation speeds. Hence, the annular plate 64 and 66 will now turn nonsynchronously as well.

Limitation of differentiation occurs as a result of continued nonsynchronous rotation of the annular plates 64 and 66 and, consequently, the wheel shafts 36 and 38. When the wheel shafts rotate at different angular velocities, the annular plates 64 and 66 rotate at different angular velocities as well. If this continues, the high viscosity fluid 60 becomes heated due to the shear action of the annular plates moving nonsynchronously in the high viscosity fluid 60. This heating causes the high viscosity fluid 60 to expand, applying pressure on the annular cover plate 68. Because the annular cover plate 68 is attached to the differential gear sleeve 46, the differential gear sleeve 46 and its attached differential gear 52 are urged to move as well by the high viscous fluid pressure. The expansion of high viscosity fluid forces the differential gear 52 into tighter mesh with the bevel gear 54. As the pressure increases, so too does the meshing force. Tighter meshing between the differential gear and the bevel gear tends to limit free rotation of the bevel gear. Because the bevel gear can no longer freely rotate, differentiation is no longer unlimited, and some of the drive train torque is transferred to the wheel shaft which is turning slowest, causing it to rotate or rotate faster. This limitation on differentiation has the effect of bringing rotation of the annular plates 64 and 66 into closer synchroneity; that is, the angular velocity of the two sets of annular plates becomes more nearly the same. As pressure continues to rise in the high viscosity fluid and meshing between the differential gear and the bevel gear continues to tighten, the drive train torque tends to smoothly distribute between the shafts until a maximum torque output is achieved. Thus, as the plates rotate in the high viscosity fluid, turbulence and fluid friction cause a build up of heat and pressure within the chamber. This build up of pressure causes the annular cover plate to move toward the bevel gear. The resulting increased meshing of the differential gear with the bevel gear imparts frictional resistance to bevel gear rotation. As torque is transferred in a linear fashion, there is a tendency to relieve the fluid internal pressure. One of two things will happen: either the annular cover plate will move sufficiently to reduce the pressure and temperature build up; or resistance to differentiation will cause the speed differences between the input and output shafts to be reduced, thus reducing the turbulence and friction at the annular plates, hence dropping the temperature. Therefore, the linear response limited slip differential is a self correcting mechanism.

Figure 4:
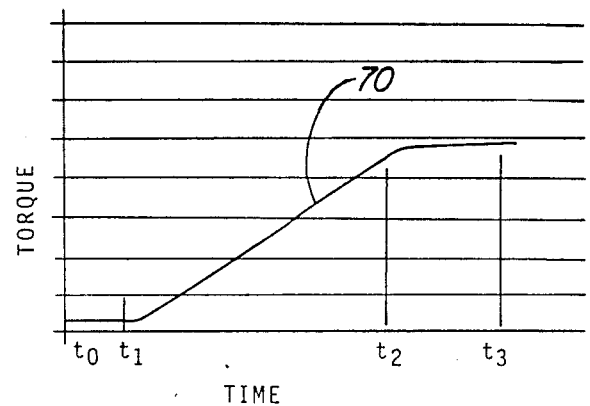
FIG. 4 is a graph showing the response curve of the differential and viscous coupling of FIG. 3.
Figure 5:
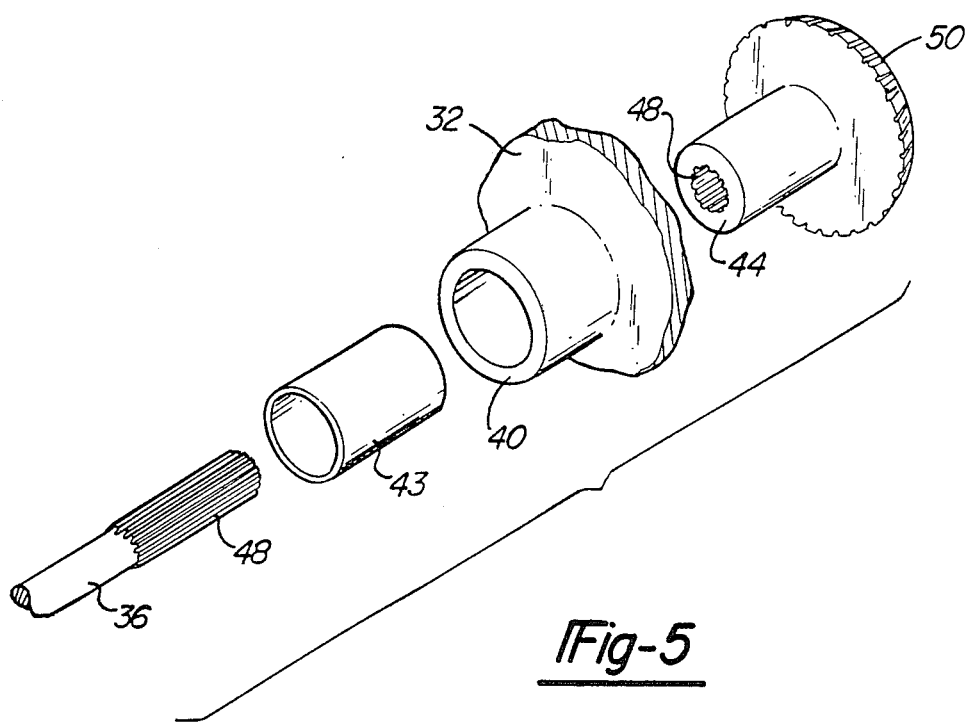
FIG. 5 is a diagrammatic exploded perspective end view for purpose of clarification of FIG. 3.

The operation of the present invention and its preferred operational characteristics that distinguish it from the prior art may be seen by reference to FIG. 4, which is a graph of the response curve 70 for the present invention. Between times $T_0$ and $T_1$, the torque output is low, so as not to affect steering and handling of the vehicle under normal driving maneuvers, such as rounding a curve or wheel sizes that are not equal. Between times $T_1$ and $T_2$, the differential and coupling according to the invention will deliver smoothly and linearly increasing torque to the slower turning of the two wheel axles, that is, the more tractive wheel axle. This feature provides "straight line steering" when on slippery road surfaces, as well as the ability to get out of a "stuck" condition, where, because of differential action, the wheel which has encountered a slippery road surface will turn while the other wheel which has good traction will not turn. Between time $T_2$ and $T_3$, the torque output reaches a maximum value, which is within the safe operating limits of the limited slip differential according to the present invention.

Other configurations of the present invention are possible. For instance, a cone backed differential gear could be used to transfer torque between the two shafts. Further, it is also possible to use a thrust block between the faces of the differential gears as a means of increasing the resistance to relative rotation of the differential gear sleeves. In this configuration, fluid pressure would cause the faces of the differential gears to contact the thrust block as the cover plate moves, causing a linear transfer of torque and eventual synchroneity in angular velocity therebetween. Other similar means of increasing resistance of rotation of the differential gear sleeves are also contemplated by the present invention. It should be kept in mind that specific operational characteristics of the limited slip differential according to the present invention can be achieved by variation and the viscous coupling variables as enumerated above. Further, the use of the limited slip differential according to the present invention contemplates connection of the ring gear to a first portion of the drive train while the differential gear sleeves are connected to second and third portions of the drive train, respectively. In the preferred environment of operation, the first portion of the drive train is connected to the engine drive components and the second and third portions of the drive train are connected to the drive wheels, respectively. To those skilled in the art, it is clear that the limited slip differential of the present invention can be used in two wheel front drive or two wheel rear drive as well as four wheel drive systems.

To those skilled in the art to which this invention appertains, the above described preferred embodiment may be subject to change or modification. Such changes or modifications can be carried out without departing from the scope of the invention, which is intended to be limited only by the scope of the appended claims.

What is claimed is:

1. A linear response limited slip differential for a wheeled vehicle having a drive train, said drive train having a first portion, a second portion and a third portion, said linear response limited slip differential comprising:

a housing having a first end and second end;

means for connecting said housing to said first portion of said drive train so that said housing will rotate in response to rotation of said first portion of said drive train;

a first differential gear means rotatably mounted to said housing;

first differential gear mounting means attached to said housing for rotatably mounting said first differential gear means to said housing;

means for connecting said first differential gear means to said second portion of said drive train;

a second differential gear means rotatably mounted to said housing;

second differential gear mounting means mounted to said housing for rotatably mounting said second differential gear means to said housing; one of said first and second differential gear mounting means permitting one of said first and second differential gear means to be slidable in relation to said housing;

means for connecting said second differential gear means to said third portion of said drive train;

bevel gear means rotatably attached in fixed relation to said housing, said bevel gear means gearingly engaging said first and second differential gear means;

a fluid chamber inside said housing;

a fluid having a predetermined viscosity value, said fluid filling at least a portion of said fluid chamber;

a first set of plates in said fluid chamber, said first set of plates being attached to said housing;

a second set of plates in said fluid chamber, said second set of plates being attached to one of said first and second differential gear means, said second set of plates interleaving said first set of plates;

means for biasing one of said first and second differential gear means toward said bevel gear means when said fluid heats and expands due to said first and second set of plates rotating nonsynchronously, said nonsynchronous rotation of said first and second set of plates being caused by said second and third portions of said drive train rotating nonsynchronously, said nonsynchronous rotation of said second and third portions of said drive train resulting in said first and second differential gear means rotating nonsynchronously, said bevel gear means rotating to accommodate said nonsynchronous rotation of said first and second differential gear means, said first and second set of plates rotating nonsynchronously when said first and second differential gear means rotate nonsynchronously; and means for transferring torque between said first and second differential gear means when one of said first and second differential gear means is biased toward said bevel gear means.

2. The linear response limited slip differential of claim 1, wherein said housing has at each of said first and second ends a bearing hub; further wherein each of said first and second differential gear means comprises:

a differential gear sleeve mounted to one of said bearing hubs, said differential gear sleeve having an inside and an outside surface, said inside surface forming an axial cavity, said axial cavity having straight splines on said inside surface thereof; and a differential gear mounted to said differential gear sleeve, said differential gear further being mounted inside said housing for engaging said bevel gear means.

3. The linear response limited slip differential of claim 2, wherein said means for connecting said first differential gear means to said second portion of said drive train comprises a first axle connected to said second portion of said drive train, said first axle having at one end splines, said splines on said first axle engaging said splines on said inside surface of said axial cavity of said differential gear sleeve of said first differential gear means.

4. The linear response limited slip differential of claim 3, wherein said means for connecting said second differential gear means to said third portion of said drive train comprises a second axle connected to said third portion of said drive train, said second axle having at one end splines, said splines on said second axle engaging said splines on said inside surface of said axial cavity of said differential gear sleeve of said second differential gear means.

5. The linear response limited slip differential of claim 2, wherein said differential gear sleeve of said first differential gear means is axially slidable within said bearing hub of said first end of said housing.

6. The linear response limited slip differential of claim 5, wherein said means for biasing biases said first differential gear means, said means for biasing comprising:

a cover plate attached to said first differential gear means, said cover plate forming a portion of said fluid chamber, said cover plate further sealably abutting said housing, said cover plate being biased toward said bevel gear means by said fluid, said cover plate being increasingly biased toward said bevel gear means in response to increased heating of said fluid when said first and second sets of plates rotate nonsynchronously.

7. The linear response limited slip differential of claim 6, wherein said means for transferring torque is an increasing meshing force between said differential gear of said first differential gear means and said bevel gear means in response to said biasing of said cover plate, resulting in a linearly increasing transfer of torque between said second and third portions of said drive train after a predetermined time has elapsed.

8. The linear response limited slip differential of claim 5, wherein said means for connecting said housing to said first portion of said drive train comprises:
   a pinion gear connected to said first portion of said drive train; and
   a ring gear connected exteriorly to said housing and engaging said pinion gear.

9. The linear response limited slip differential of claim 8, wherein said bevel gear means is a bevel gear and each of said differential gears is a bevel gear.

10. The linear response limited slip differential of claim 8, wherein said bevel gear means is a conically shaped gear, and each of said differential gears is a conically shaped gear.

11. A linear response limited slip differential for a wheeled vehicle having a drive train, said drive train having a first portion, a second portion and a third portion, said linear response limited slip differential comprising:
   a housing having a first end and a second end, said first end having integral therewith a first bearing hub, said second end having integral therewith a second bearing hub;
   means for connecting said housing to said first portion of said drive train so that said housing will rotate in response to rotation of said first portion of said drive train;
   a first differential gear sleeve bearingly mounted to said first bearing hub, said first differential gear sleeve being mounted to said first bearing hub so that said first differential gear sleeve may translatably move relative to said housing, said first differential gear sleeve further having an inner surface, said inner surface forming an axial cavity, said axial cavity of said first differential gear sleeve having splines on said inner surface thereof;
   a first differential gear mounted to said first differential gear sleeve;
   a first axle connected to said second portion of said drive train, said first axle having splines at one end thereof, said one end of said first axle being received in said axial cavity of said first differential gear sleeve wherein said splines on said first differential gear sleeve and said splines on said first axle are engaged, said first differential gear sleeve being movable translatably relative to said first axle;
   a second differential gear sleeve bearingly mounted to said second bearing hub, said second differential gear sleeve having an inner surface, said inner surface thereof forming an axial cavity, said axial cavity of said second differential gear sleeve having splines on said inner surface thereof;
   a second differential gear mounted to said second differential gear sleeve;
   a second axle connected to said third portion of said drive train, said second axle having splines at one end thereof, said one end of said second axle being received in said axial cavity in said second differential gear sleeve wherein said splines on said second differential gear sleeve and said splines on said second axle are engaged;
   bevel gear means rotatably attached in fixed relation to said housing, said bevel gear means gearingly engaging said first and second differential gears;
   a fluid chamber inside said housing;
   a fluid having a predetermined viscosity value, said fluid filling at least a portion of said fluid chamber;
   a first set of annular plates in said fluid chamber, said first set of annular plates being attached to said housing;
   a second set of annular plates in said fluid chamber, said second set of annular plates being attached to said first differential gear sleeve, said second set of annular plates interleaving said first set of annular plates; and
   means for biasing said first differential gear sleeve toward said bevel gear means when said fluid heats and expands due to said first and second set of annular plates rotating nonsynchronously, said nonsynchronous rotation of said first and second set of annular plates being caused by said second and third portions of said drive train rotating nonsynchronously, said nonsynchronous rotation of said second and third portions of said drive train resulting in said first and second differential gear sleeves rotating nonsynchronously, said bevel gear means rotating to accommodate said nonsynchronous rotation of said first and second differential gear sleeves, said first and second set of annular plates rotating nonsynchronously when said first and second differential gear sleeves rotate nonsynchronously; and
   means for transferring torque between said first and second differential gear sleeves when one of said first and second differential gears is biased toward said bevel gear means.

12. The linear response limited slip differential of claim 11, wherein said means for biasing comprises:
   a cover plate attached to said first differential gear sleeve, said cover plate forming a portion of said fluid chamber, said cover plate further sealably abutting said housing, said cover plate being biased toward said bevel gear means by said fluid, said cover plate being increasingly biased toward said bevel gear means in response to increased heating of said fluid when said first and second set of annular plates rotate nonsynchronously.

13. The linear response limited slip differential of claim 12, wherein said means for transferring torque is an increasing meshing force between said first differential gear and said bevel gear means in response to biasing of said cover plate, said increasing meshing force resulting in a linearly increasing transfer of torque between said second and third portion of said drive train after a predetermined time has elapsed.

14. The linear response limited slip differential of claim 13, wherein said means for connecting said housing to a first portion of said drive train comprises:
   a pinion gear connected to said first portion of said drive train; and
   a ring gear connected exteriorly to said housing and engaging said pinion gear.

15. The linear response limited slip differential of claim 14, wherein said bevel gear means is a bevel gear and each of said differential gears is a bevel gear.

16. The linear response limited slip differential of claim 14, wherein said bevel gear means is a conically shaped gear and each of said first and second differential gears is a conically shaped gear.

17. A linear response limited slip differential for a wheeled vehicle having a drive train, said drive train having a first portion, a second portion and a third portion, said linear response limited slip differential comprising:

a housing having a first end and a second end, said first end having integral therewith a first bearing hub, said second end having integral therewith a second bearing hub;

means for connecting said housing to said first portion of said drive train so that said housing will rotate in response to rotation of said first portion of said drive train;

a first differential gear sleeve bearingly mounted to said first bearing hub, said first differential gear sleeve being mounted to permit translatable movement thereof relative to said housing, said first differential gear sleeve further having an inner surface, said inner surface forming an axial cavity, said axial cavity of said first differential gear sleeve having splines on said inner surface thereof;

a first differential gear mounted to said first differential gear sleeve;

a first axle connected to said second portion of said drive train, said first axle having splines at one end thereof, said one end of said first axle being received in said axial cavity in said first differential gear sleeve wherein said splines on said first differential gear sleeve and said splines on said first axle are engaged, said first differential gear sleeve being movable translatably relative to said first axle;

a second differential gear sleeve bearingly mounted to said second bearing hub, said second differential gear sleeve having an inner surface, said inner surface forming an axial cavity, said axial cavity of said second differential gear sleeve having splines on said inner surface thereof;

a second differential gear mounted to said second differential gear sleeve;

a second axle connected to said third portion of said drive train, said second axle having splines on one end thereof, said one end of said second axle being received in said axial cavity of said second differential gear sleeve wherein said splines on said second differential gear sleeve and said splines on said second axle are engaged;

bevel gear means rotatably attached in fixed relation to said housing, said bevel gear means gearingly engaging said first and second differential gears;

a fluid chamber inside said housing;

a fluid having a predetermined viscosity value, said fluid filling at least a portion of said fluid chamber;

a first set of annular plates in said fluid chamber, said first set of annular plates being attached to said housing;

a second set of annular plates in said fluid chamber, said second set of annular plates being attached to said first differential gear sleeve, said second set of annular plates interleaving said first set of annular plates; and means for biasing said first differential gear sleeve toward said bevel gear means when said fluid heats and expands when said first and second set of annular plates rotate nonsynchronously, said nonsynchronous rotation of said first and second set of annular plates being caused by said second and third portions of said drive train rotating nonsynchronously, said nonsynchronous rotation of said second and third portions of said drive train resulting in said first and second differential gear sleeves rotating nonsynchronously, said bevel gear means rotating to accommodate said nonsynchronous rotation of said first and second differential gear sleeves, said first and second set of annular plates rotating nonsynchronously when said first and second differential gear sleeves rotate nonsynchronously, said biasing of said first differential gear sleeve causing resistance to rotation by said bevel gear means, said resistance to rotation by said bevel gear means causing a transfer of torque between said first and second differential gear sleeves, said means for biasing comprising:

a cover plate attached to said first differential gear sleeve, said cover plate forming a portion of said fluid chamber, said cover plate further sealably abutting said housing, said cover plate being biased toward said bevel gear means by said fluid, said cover plate being increasingly biased toward said bevel gear means in response to heating of said fluid when said first and second set of annular plates rotate nonsynchronously, said resistance to rotation of said bevel gear means resulting in a linearly increasing transfer of torque between said second and third portions of said drive train after a predetermined time has elapsed.

18. The linear response limited slip differential of claim 17, wherein said means for connecting said housing to a first portion of said drive train comprises:

a pinion gear connected to said first portion of said drive train; and a ring gear connected exteriorly to said housing and engaging said pinion gear.

19. The linear response limited slip differential of claim 18, wherein said bevel gear means is a bevel gear and each of said differential gears is a bevel gear.

20. The linear response limited slip differential of claim 18, wherein said bevel gear means is a conically shaped gear and each of said first and second differential gears is a conically shaped gear.

* * * * *

UNITED STATES PATENT AND TRADEMARK OFFICE
CERTIFICATE OF CORRECTION

PATENT NO. : 4,869,129

DATED : September 26, 1989

INVENTOR(S) : Daniel W. Hazebrook

It is certified that error appears in the above-identified patent and that said Letters Patent is hereby corrected as shown below:

Column 4, line 54, delete "A" and insert ---- a ----.

Column 4, line 55, delete "sleeves" and insert ---- sleeve ----.

Signed and Sealed this

Ninth Day of April, 1991

Attest:

HARRY F. MANBECK, JR.

*Attesting Officer*       *Commissioner of Patents and Trademarks*